United States Patent

Anthony

[15] 3,680,118

[45] July 25, 1972

[54] AIRCRAFT NAVIGATION RECEIVER APPARATUS USING ACTIVE FILTERS

[72] Inventor: Myron L. Anthony, La Grange, Ill.

[73] Assignee: Statistical Services, Inc., Chicago, Ill. ; a part interest

[22] Filed: July 14, 1970

[21] Appl. No.: 54,778

Related U.S. Application Data

[63] Continuation-in-part of Ser. No. 713,786, March 18, 1968, abandoned.

[52] U.S. Cl. ..........................343/106 R, 324/83 A, 343/107

[51] Int. Cl. ..........................................................G01s 1/44

[58] Field of Search .........................343/106, 107; 324/83 A

[56] References Cited

UNITED STATES PATENTS

| | | | |
|---|---|---|---|
| 3,096,480 | 7/1963 | Pihl | 324/83 A |
| 3,495,247 | 2/1970 | Perkins | 343/106 R |

*Primary Examiner*—Benjamin A. Borchelt
*Assistant Examiner*—Richard E. Berger
*Attorney*—Kinzer, Dorn & Zickert

[57] ABSTRACT

Aircraft navigation receiver apparatus of the kind in which two data signals are compared to determine the orientation of an aircraft (e.g., VOR and ILS receivers). Active filters, including integrators, constant current amplifiers and differential tuned amplifiers, and particularly constant slew rate filters, eliminate extraneous frequencies from the data signals without the phase distortion and other errors of passive filter circuits. A limiter circuit is preferably interposed in the receiver apparatus ahead of any of the filtering means. A phase detector that is inherently immune to amplitude variations is provided. For VOR receivers, a phase discriminator that is inherently immune to amplitude modulation distortion is presented. An AGS circuit for the receiver apparatus, which operates substantially independently of any amplitude modulation in the received signal, is provided.

25 Claims, 21 Drawing Figures

Inventor
Myron L. Anthony
By Wallace, Kinzer and Dorn
Attorneys

Inventor
Myron L. Anthony
By Wallace, Kinzer and Dorn
Attorneys

Inventor
Myron L. Anthony
By Wallace, Kinzer and Dorn
Attorneys

Inventor
Myron L. Anthony
By Wallace, Kinzer and Dorn
Attorneys

Inventor
Myron L. Anthony
By Kinzer, Dorn and Zickert
Attorneys

Inventor
Myron L. Anthony
By Kinzer, Dorn and Zickert
Attorneys

AIRCRAFT NAVIGATION RECEIVER APPARATUS USING ACTIVE FILTERS

CROSS REFERENCES TO RELATED APPLICATIONS

This is a continuation-in-part of Myron L. Anthony application Ser. No. 713,786 filed Mar. 18, 1968, now abandoned, for "Aircraft Navigation Receiver Apparatus". The receivers of this application utilize circuits disclosed and claimed in Myron L. Anthony application Ser. No. 11,399 filed Feb. 16, 1970, for "Constant Slew Rate Circuits".

BACKGROUND OF THE INVENTION

Almost from the inception of the use of VOR omnirange radio navigation facilities, there have been substantial difficulties and errors apparent in the operation of the systems. A VOR transmitter radiates two signals; one is a 30 hz reference signal that is frequency-modulated upon a sub-carrier of 9,960 hz, and the other is a variable-phase signal of 30 hz. The phase relation between the two signals, as received in an aircraft navigation receiver, defines the bearing of the aircraft relative to a reference path constituting a radial path intersecting the location of the transmitter.

Substantial excursion errors are frequently evident in the operation of receiver and indicator apparatus utilizing these signals, to the extent that the signals along many radials for some stations are classified as unusable for navigation purposes. The presence of these errors has long been recognized and they have usually been attributed to multi-path signals created by the presence of reflectors that re-radiate the transmitted signals to the aircraft with substantial changes in phase. But this classical analysis of these "bends", "scallops", and other like errors, based on the reflection concept, is inconsistent with the facts. In typical cases, re-radiating surfaces having cross-sections 20 to 100 times those actually present would be required to create the observed errors. The principal causes of the actual errors have not previously been generally known and no basic solution to the problem has heretofore been advanced.

A similar problem exists in relation to the ILS systems employed for the critical operation of landing aircraft under adverse weather conditions. Present ILS systems utilize two radiated signals, one of 90 hz and the other of 150 hz, modulated upon suitable carriers. These signals are detected and compared to indicate a reference path constituting a desired glide path, the glide path constituting a zone in which the received signals are of approximately equal amplitude.

In aircraft navigation receiver apparatus, as employed in the prior art, it has been customary to use so-called "passive" band-pass filter circuits to eliminate extraneous frequencies from the data signals as received and detected. These passive filter circuits, sometimes referred to as "linear" filter circuits, while highly satisfactory and effective in many fields of application, frequently introduce substantial errors into the aircraft navigation data signals. The asymmetrical characteristics of these filters produce selective side band attenuation, producing substantial phase shift distortion in the data signals in the presence of low frequency amplitude modulation of the received signals.

Any minor change in the frequency of the data signals also affects the attenuation characteristics of the band-pass filters. Because attenuation and phase shift are closely related, a serious phase error frequently results. Changes in filter impedances, due to aging or temperature effects, have the same result.

The frequency discriminators and phase detectors used in modern VOR receivers also produce spurious responses and substantial phase shifts in the presence of amplitude modulation in the received signals, including amplitude modulation that may occur at very low frequencies. The detector and discriminator circuits customarily employed are square law devices, in their function, and consequently are susceptible to harmonic distortion. They also produce substantial phase shifts in response to unbalanced noise and in response to relatively minor frequency changes. In at least one widely-used VOR receiver phase detector, it can be shown that an amplitude radio of 2:1 between the reference and variable-phase signal voltages produces an indicator movement change of more than 25 percent.

The amplitude modulation effects that appear in the radiated navigation signal as received by the aircraft navigation receivers are not adequately controlled by the AGC circuits incorporated in the initial stages of the receivers. Present AGC systems are quite non-linear in performance and tend to introduce substantial distortion and excessive cross modulation. Cross modulation generates unwanted frequency components in the very low frequency range, causing some of the spurious responses in the filter, detector, and discriminator circuits discussed above. Moreover, at certain low frequencies the AGC systems tend to become regenerative and enhance the effect of low frequency "standing wave" modulation.

SUMMARY OF THE INVENTION

It is a principal object of the invention, therefore, to provide an aircraft navigation receiver apparatus that incorporates active filter circuit means, instead of the passive filters of the prior art, and that is effective to minimize or eliminate extraneous frequencies from the received data signals without introducing phase distortion or other errors into those signals. The active filtering circuit means employed are immune to amplitude modulation effects, minor frequency changes, and component aging or other drift; they exhibit exceptional noise immunity and stability.

In this specification and in the appended claims, the terms "active filter" and "active filtering means" are each defined as meaning an amplifier circuit, or pair of amplifier circuits, having a relatively limited following rate and utilized as a band-pass, low-pass, or high-pass filter, which affords essentially zero phase distortion over the complete operating frequency range of the receiver circuit in which the filter is used.

Another object of the invention is to provide aircraft navigation receiver apparatus that effectively eliminates low-frequency amplitude-modulation distortion in the operation of discriminator circuits, AGC circuits, and phase detector circuits in the receiver apparatus, and that is unaffected by unbalanced noise in the received signals.

Accordingly, the invention relates to aircraft navigation receiver apparatus of the kind in which first and second data signals radiated from a navigation station are compared to determine the orientation of an aircraft relative to a reference, the reference comprising a given path intersecting the navigation station. The receiver includes first and second signal channels for translating the first and second data signals into forms suitable for comparison with each other; each of the two signal channels comprises active filtering means for eliminating extraneous signals without appreciable phase distortion or other distortion of the data signals. Utilization means, comprising comparison means coupled to both signal channels, utilizes the two data signals, as translated through the signal channels, to determine the orientation of the aircraft. The active filtering means, in each signal channel, may comprise a limiter amplifier connected in series with two integrator circuits; the active filtering means may also comprise a limiter amplifier connected in series with two constant current amplifiers each having a capacitor connected from the amplifier output to ground or some other source of reference potential. In another form, the active filtering means may constitute a differential amplifier having a squared data signal as one input and having a resonant circuit, variably tuned by the amplifier output, connected back to a second input. In still another form, the active filtering means may comprise constant slew rate filters of the kind disclosed in the aforementioned application Ser. No. 11,399.

In a VOR receiver, constructed in accordance with one form of the invention, separation of the reference and variable data signals may be effected with resistance-capacitance filters having operational characteristics intersecting approximately at the logarithmic mean of the two signal frequencies. Discriminator and phase comparator circuits comprising push-pull differential amplifiers driven in phase opposition, with both stages of the amplifier driven to saturation and cutoff in alternate half cycles, are incorporated in some embodiments of the invention. In one preferred construction, an AGC circuit is provided that includes a plurality of series-connected purely reactive voltage dividers feeding a constant gain amplifier with a direct-current feedback circuit from the output of the amplifier to vary the reactance in one leg of each voltage divider. Preferably, a limiter circuit is incorporated in the receiver apparatus ahead of any of the filtering means for the receiver.

DESCRIPTION OF THE PREFERRED EMBODIMENTS

Figures 1, 2A, 2B:
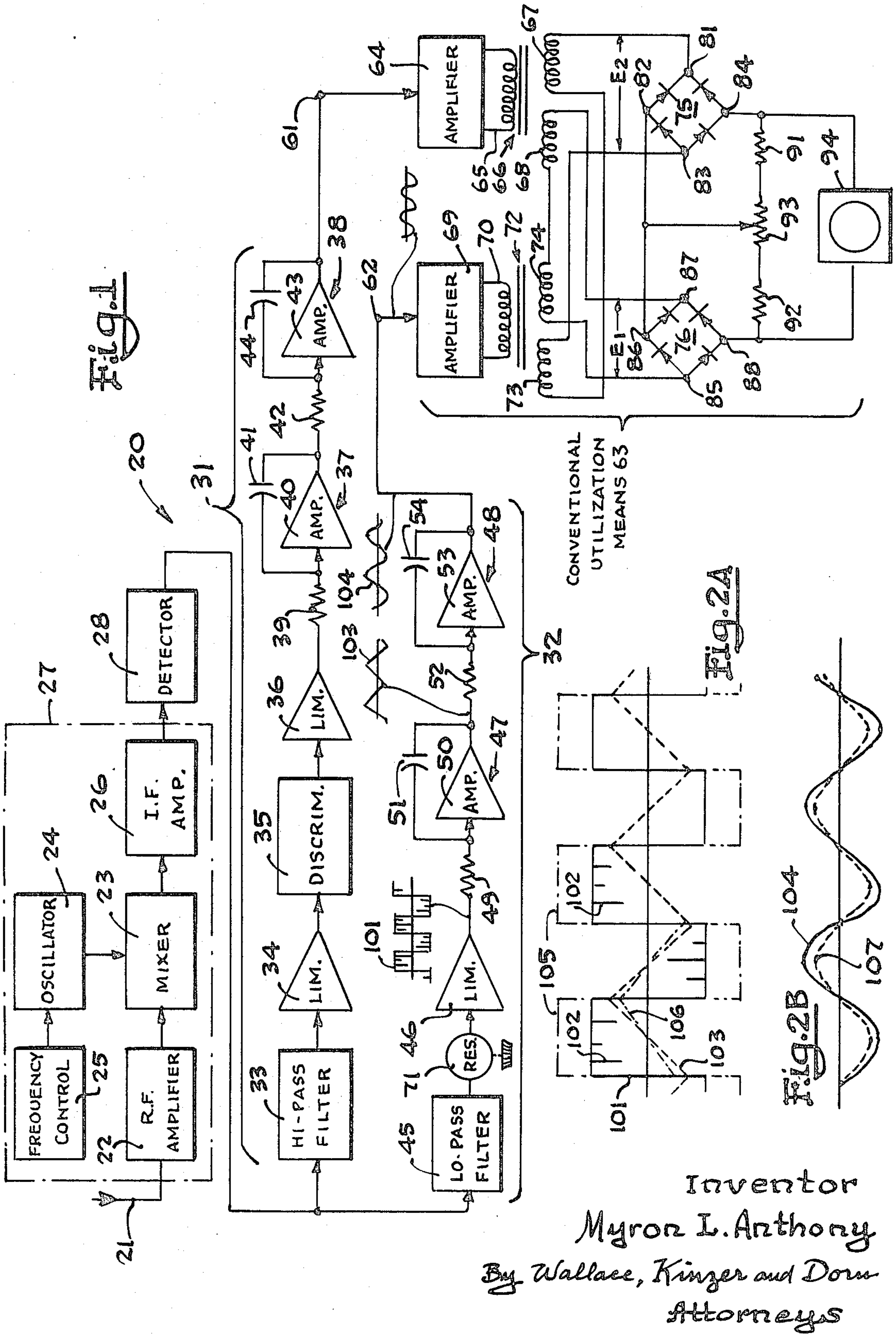
FIG. 1 is a block diagram, partly schematic, of an aircraft navigation receiver apparatus constructed in accordance with one embodiment of the present invention.
FIGS. 2A and 2B are waveform diagrams employed to explain the operation of active filtering means incorporated in the receiver apparatus of FIG. 1.

FIG. 1 illustrates an aircraft navigation receiver apparatus 20, in this instance a VOR receiver, constructed in accordance with one embodiment of the present invention. Receiver 20 includes an antenna 21 connected to a radio-frequency amplifier 22 which is in turn connected to a mixer circuit 23. Mixer 23 has a second input derived from an oscillator 24, the frequency of oscillator 24 being controlled by a frequency control circuit 25. The output of mixer 23 is connected to an intermediate-frequency amplifier 26. It will be recognized that the circuits 22 through 26 are generally conventional; they constitute the initial input stage 27 of receiver 20. The output of IF amplifier 26 is connected to a detector 28, which may be of conventional construction.

The output signal from detector 28 is coupled to a first signal channel 31 and to a second signal channel 32. The first signal channel 31 includes, in series, a high-pass filter 33, a limiter amplifier 34, a discriminator 35, and a limiter amplifier 36. For a VOR receiver, the high-pass filter 33 should have a cut-off frequency above 30 hz in order to eliminate the variable-phase component of the VOR signal from signal channel 31, channel 31 being the reference data signal channel.

The preferred operating characteristics and preferred constructions for high-pass filter 33 are discussed in detail hereinafter. Limiter amplifier 34 is utilized to restrict the amplitude of the data signal transmitted through channel 31 to a predetermined maximum and is incorporated in the signal channel primarily to preclude phase distortion of the reference data signal as that signal is processed indiscriminator 35. Discriminator 35 may be of conventional construction, but preferably is a form of discriminator, constituting a product detector circuit, that minimizes the phase distortion in the output signal. A specific preferred form of discriminator is described hereinafter in conjunction with FIG. 4. Limiter amplifier 36 may be of conventional construction and again assures the reduction of the data signal to a substantially rectangular waveform.

The first signal channel of receiver 20, the reference data channel 31, further comprises active filtering means, of which limiter amplifier 36 is a part. The active filtering means includes two integrator circuits 37 and 38 connected in series in the signal channel following limiter 36.

Integrator 37 is of relatively simple and economical construction and comprises a conventional solid state operational amplifier 40 having a resistor 39 connected in series in the input circuit to the amplifier from limiter 36. A capacitor 41 is connected in parallel with amplifier 40, between the input and output terminals of the amplifier. Integrator 38 is of similar construction and includes an input resistor 42, a solid state operational amplifier 43, and a capacitor 44 that is connected between the output and input terminals of amplifier 43.

In the VOR receiver 20 the second channel 32 is the signal channel for the 30 hz variable phase signal. It comprises a low pass filter 45 coupled to a conventional OBS resolver 71 for effecting an adjustable phase shift in the signal translated through channel 32. The output of resolver 71 is connected to a limiter amplifier 46 followed by two integrator circuits 47 and 48. Integrator 47 is similar in construction to integrator 37 and may comprise a solid state operational amplifier 50 having an input resistor 49 and having a capacitor 51 connected between the input and output terminals of the amplifier. Integrator 48 is of similar construction and includes the series input resistor 52, an amplifier 53, and a capacitor 54.

The output terminals for data signal channels 31 and 32, in receiver apparatus 20, are designated by reference numerals 61 and 62 respectively. Terminals 61 and 62 are coupled to a utilization means, including a phase detector, designated in FIG. 1 as the conventional utilization means 63. An alternate and preferred construction for the utilization means, and particularly the phase detector, is discussed in detail hereinafter in connection with FIG. 5.

In the construction shown in FIG. 1, the output terminal 61 of the first data signal channel 31 is coupled to the input of an amplifier 64. The output of amplifier 64 comprises the primary winding 65 of a transformer 66 having two secondary windings 67 and 68. Similarly, the output terminal 62 of the second data signal channel 32 is connected to the input of an amplifier 69 having an output circuit comprising the primary winding 70 of a coupling transformer 72. Transformer 72 includes two secondary windings 73 and 74.

Utilization means 63 further includes two diode bridges 75 and 76. The terminals for bridge 75 are designated by reference numerals 81, 82, 83 and 84; the terminals for bridge 76 are indicated by reference numerals 85, 86, 87 and 88. Bridge terminals 82 and 86 are connected to each other. Terminal 81 of bridge 75 is connected to one end of secondary winding 67 for transformer 66 in a series circuit that extends through the secondary winding 73 of transformer 72 and back to terminal 83 of bridge 75. Terminal 85 of bridge 76 is connected in a similar circuit to winding 74 of transformer 72, the circuit continuing through winding 68 of transformer 66 and back to bridge terminal 87. Terminals 84 and 88 constitute the output terminals for the bridge circuits and are connected to each other by a voltage divider circuit comprising two resistors 91 and 92 and a potentiometer 93, the tap on the potentiometer 93 being returned to bridge terminals 82 and 86. Terminals 84 and 88 are also connected to a conventional bearing indicator instrument (OBI) 94.

The basic operation of the VOR receiver 20 is essentially similar to that of a conventional VOR receiver and hence will be described only briefly in this specification. A VOR signal transmission intercepted at antenna 21 is amplified and heterodyned in the initial stage 27 of the receiver, producing and IF output signal from amplifier 26. The heterodyning stage comprising mixter 23, oscillator 24 and frequency control 25 is utilized to select the particular VOR station to be received. The IF signal from amplifier 26 is detected in circuit 28, producing an output signal that is amplitude-modulated in accordance with the 30 hz variable phase signal required for channel 32 and with the 9,960 hz sub-carrier upon which the 30 hz reference signal has been frequency-modulated at the VOR transmitter.

The reference signal and the variable phase signal are separated from each other into channels 31 and 32, respectively, by filters 33 and 45. The high-pass filter 33 passes the 9,960 hz reference subcarrier signal, substantially free of the 30 hz variable phase signal, to limiter 34. The output from limiter 34 is supplied to discriminator 35, the output of which is, essentially the 30 hz reference signal. But this signal may contain many harmonics and substantial noise. These extraneous signals and harmonics are effectively eliminated by the active filtering means comprising integrators 37 and 38, so that the output of signal channel 31 appearing at terminal 61 is a 30 hz reference signal of fixed phase, this being the signal supplied to amplifier 64.

Low-pass filter 45, on the other hand, passes the 30 hz variable phase signal into channel 32 but attenuates the 9,960 hz reference subcarrier to a level at which it is essentially imperceptible. The square wave output from limiter 46 may contain many harmonics of the desired 30 hz variable phase signal, and substantial noise. These extraneous signal frequencies are effectively eliminated, without appreciable phase distortion or other distortion, by the active filtering means comprising integrators 47 and 48. The signal appearing at output terminal 62 is a 30 hz signal that varies in phase to indicate the bearing of the aircraft.

Utilization means 63 is a phase comparator circuit that has been used in previously known navigation receivers, specifically in the model 51R-3 receiver of Collins Radio. Under normal on-course conditions, the two incoming signals to the phase comparator 63 are displaced 90° in phase and the two voltages E1 and E2 are equal. When the aircraft deviates from the desired on-course condition, the result is a change in phase of the variable signal supplied from channel 32 with respect to the phase of the reference signal supplied from channel 31, producing a differential between voltages E1 and E2. The amplitude and polarity of the potential difference between voltages E1 and E2 controls indicator instrument 94, showing the aircraft pilot the direction and the amplitude of the deviation of the aircraft from the desired course, set by OBS resolver 71.

Conventional filtering circuits employed in a VOR receiver, and particularly in those portions of the data signal channels following the initial filters 33 and 45, frequently introduce substantial phase differentials as the result of amplitude modulation and other distortions in the incoming signals. To be specific, the lack of symmetry around the 30 hz data signal frequency, in typical conventional passive filter circuits, may produce errors of 6° to 7° in the presence of amplitude modulations at 2 hz or other low frequencies, which are often present. The active filtering means incorporated in signal channels 31 and 32, on the other hand, effectively eliminate any phase distortion regardless of substantial amplitude changes. Furthermore, the active filtering means in these two signal channels effectively eliminate the harmonics of the reference and variable phase signals and other noise signals that are frequently present. Moreover, the active filters of receiver 20 are inherently self-limiting and stable and are not materially affected by aging of their components.

The operation of the active filtering means for channel 32, which is also typical of the active filtering means in channel 31, is illustrated in FIGS. 2A and 2B. As shown in FIG. 2A, the output signal from limiter 46 is the rectangular waveform 101, which may include some extraneous noise spikes 102. The rectangular waveform signal 101, upon integration, appears at the output of integrator 47 as the triangular wave form signal 103. After further integration in circuit 48, the output signal supplied to terminal 62 is the sinusoidal signal 104.

A change in the amplitude of the square wave signal 101 produces no change in the phase of the sinusoidal output signal 104, as long as the amplitude of the input signal 101 is sufficient so that the amplitude of the integrated triangular waveform signal 103 does not quite reach the full input amplitude. Assuming that the square wave input signal 101 is shown in FIG. 2A at the minimum operational amplitude, it can be seen that any increase in signal amplitude, as to the level indicated by phantom line 105, does not change the triangular integrated signal 103. The result is that even though the rectangular wave input signal 101 may vary over a broad range of amplitudes, the initial integrated signal 103 remains at a constant amplitude and retains a fixed relationship of a 90° phase shift with respect to signal 101. Furthermore, the output signal 104 does not change in amplitude and does not deviate from its sine wave configuration. There is a total phase shift of 180° from signal 101 to signal 104, but this phase relation remains fixed and there is no phase distortion introduced in the output signal supplied to amplifier 69.

It is possible that, with aging of components, the slope of the operating characteristics for either one or both of the integrators 47 and 48 may change. Thus, a reduction in the slope angle of integrator 47 may displace the output signal from that integrator from the curve 103 (FIG. 2A) to the lower-amplitude triangular waveform 106. This reduces the amplitude of the sine wave output signal to a level as shown by curve 107 in FIG. 2B. But there is no phase change and hence no phase distortion error introduced into the signal supplied to amplifier 69 (FIG. 1).

It is a relatively simple matter to construct integrator 47 so that it will always produce a triangular waveform displaced 90° from the original square wave input supplied by limiter 46, despite substantial changes in the amplitude of the received data signal and despite changes in the slope of the operating characteristic for the integrator that may occur with time. Similarly, it is relatively easy to provide an integrator 48 that will always produce a sine wave output signal from the integration of the triangular input signal, despite normal aging and changes in the operating characteristics of the integrator components. The result is that the filtering operation of circuits 46, 47 and 48 proceeds effectively and efficiently for an indefinite life of the circuit components without introducing the phase distortions and related errors that have been prevalent in VOR receivers and other aircraft navigation receivers. This is equally true with respect to the corresponding operation of circuits 36, 37 and 38 in signal channel 31.

Conventional passive filter circuits can be used as the high-pass filter 33 and the low-pass filter 45 in the input stages of signal channels 31 and 32 respectively. Where passive circuits are employed, the low-pass filter is preferably a simple resistance-capacitance ladder circuit of two or more stages as generally illustrated by circuit 45A in FIG. 3A. The high-pass filter, when a conventional passive filter is employed, is preferably the inverse of circuit 45A and constitutes a ladder RC filter 33A of the kind illustrated in FIG. 3B.

Figures 3A, 3B, 3C, 4:
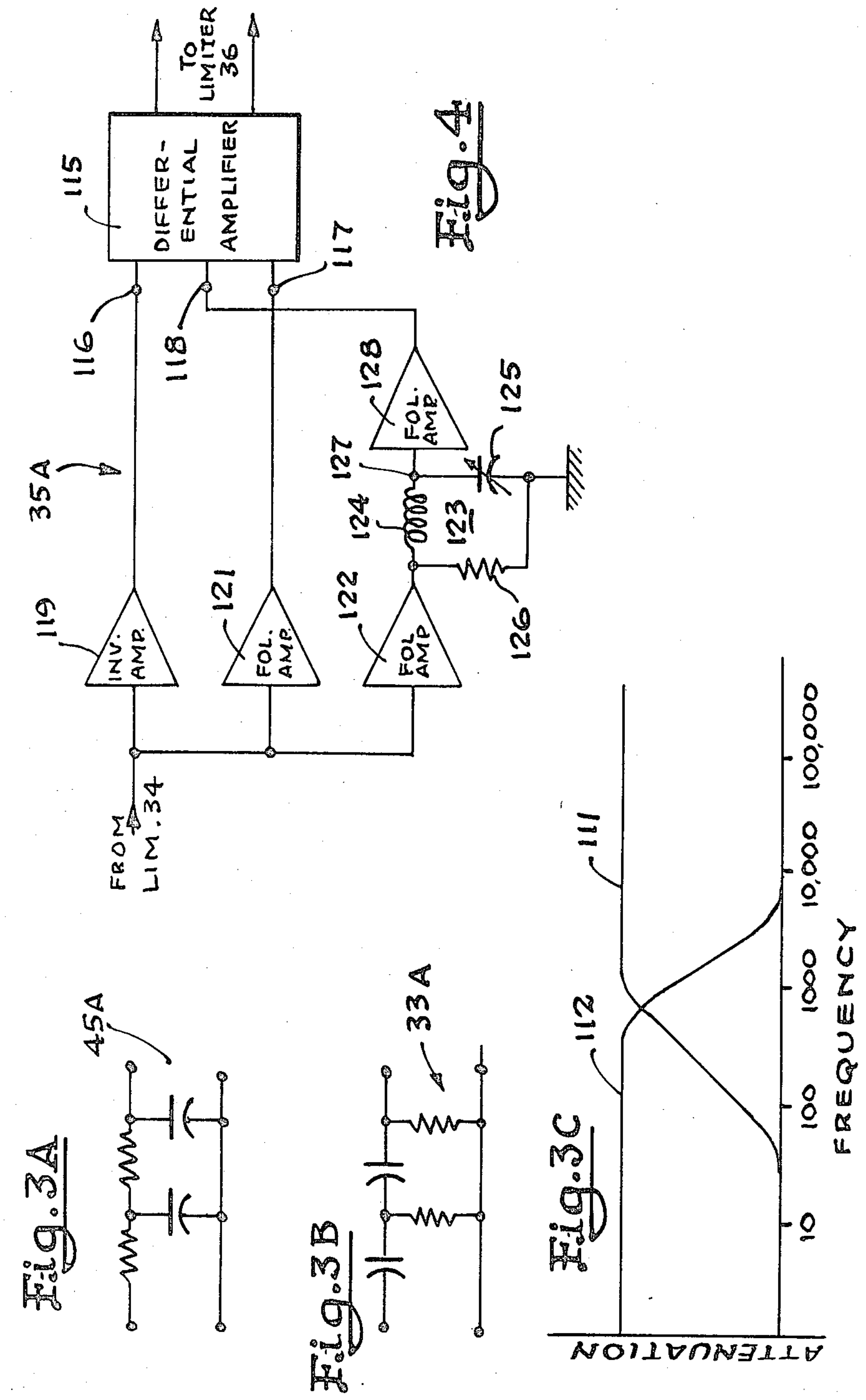
FIGS. 3A and 3B are schematic diagrams of individual filter circuits incorporated in the receiver apparatus of FIG. 1.
FIG. 3C illustrates the operating characteristics of the filter circuits of FIGS. 3A and 3B.
FIG. 4 is a block diagram, partly schematic, of a preferred form of discriminator incorporated in the receiver apparatus of FIG. 1.

In order to avoid unwanted phase distortion, when passive filter circuits 33A and 45A are employed, the components for those circuits should be selected to afford operating characteristics that intersect approximately at the logarithmic mean of the 30 hz variable phase signal and the 9,960 hz reference subcarrier. This relationship is illustrated in FIG. 3C, in which the attenuation-frequency characteristic of the low-pass filter 33A is shown as curve 111 and the operating characteristic for high-pass filter 45A is shown by curve 112. Selection of components to achieve this desired relationship between the operating characteristics for the two filters, which is a relatively simple matter, assures maximum rejection of the unwanted signal frequencies in each of the two signal channels without introducing excessive phase distortion.

As noted above, the discriminator circuit 35 of reference signal channel 31 (FIG. 1), if of conventional construction, may well constitute a substantial source of phase distortion as the result of sensitivity of the discriminator to amplitude changes and other factors. FIG. 4 illustrates a preferred form of discriminator 35A, that effectively minimizes and in fact virtually eliminates errors arising from this source. Discriminator 35A is essentially similar in many respects to the discriminator circuits described in U.S. Pat. No. 3,024,419, to Myron L. Anthony; accordingly, only a relatively simplified description is required in this specification and in FIG. 4.

Discriminator 35A comprises a push-pull differential amplifier 115 having two individual input terminals 116 and 117 and a common input terminal 118 for both stages of the push-pull amplifier. The 9,960 hz square wave signal from limiter 34 is supplied to terminal 116 of amplifier 115 through an inverting amplifier 119. The reference subcarrier signal from limiter 34 is also supplied to terminal 117 of amplifier 115, but through a follower amplifier 121. That is, the reference signal is applied to the two input terminals 116 and 117 of the differential push-pull amplifier 115 in phase opposition.

The square wave reference signal from limiter 34 is also applied to the input of a follower amplifier 122. The output of amplifier 122 is applied to a phase shifting circuit 123 comprising a series inductance 124 and an adjustable capacitor 125 that is connected from the output terminal of inductance 124 to ground or other source of reference potential. A resistor 126 is included in the phase shift circuit, being connected between the output terminal of amplifier 122 and ground. The common terminal 127 of inductance 124 and capacitance 125 is connected to the input of a follower amplifier 128. The output of amplifier 128 is connected to the common input terminal 118 of the push-pull differential amplifier 115.

In operation of discriminator circuit 35A, FIG. 4, the signal levels for amplifiers 119 and 121 are selected so that both stages of the push-pull amplifier 115 are driven to saturation in alternate half cycles of the reference subcarrier signal. At the same time, the reference signal is supplied to both stages through the common input terminal 118 but with a phase shift of 90° induced by circuit 123. This signal cuts off both stages of the differential amplifier on alternate half cycles but with a 90° phase shift relative to the two individual input signals. Under these circumstances, the two input signals from amplifiers 119 and 121 are multiplied together in amplifier 115, producing an output constituting a signal representative of the 30 hz frequency-modulation on the reference subcarrier input, this signal being supplied to limiter 36. The operation of the "product detector" discriminator circuit is described in greater detail in the aforementioned U.S. Pat. No. 3,024,419 of Myron Anthony. Of significant importance is the fact that the output signal supplied to limiter 36 is independent of amplitude changes in the input signals to differential amplifier 115, so long as the input signal amplitudes remain great enough to drive each stage of the differential amplifier to saturation in each half cycle of operation. Furthermore, the output signal from the differential amplifier is not affected by distortions in the waveform of the input signals; substantial noise and harmonic distortion can be tolerated in the input to the discriminator 35A and is effectively eliminated in the output of the circuit.

Figures 5, 6A, 6B, 7:
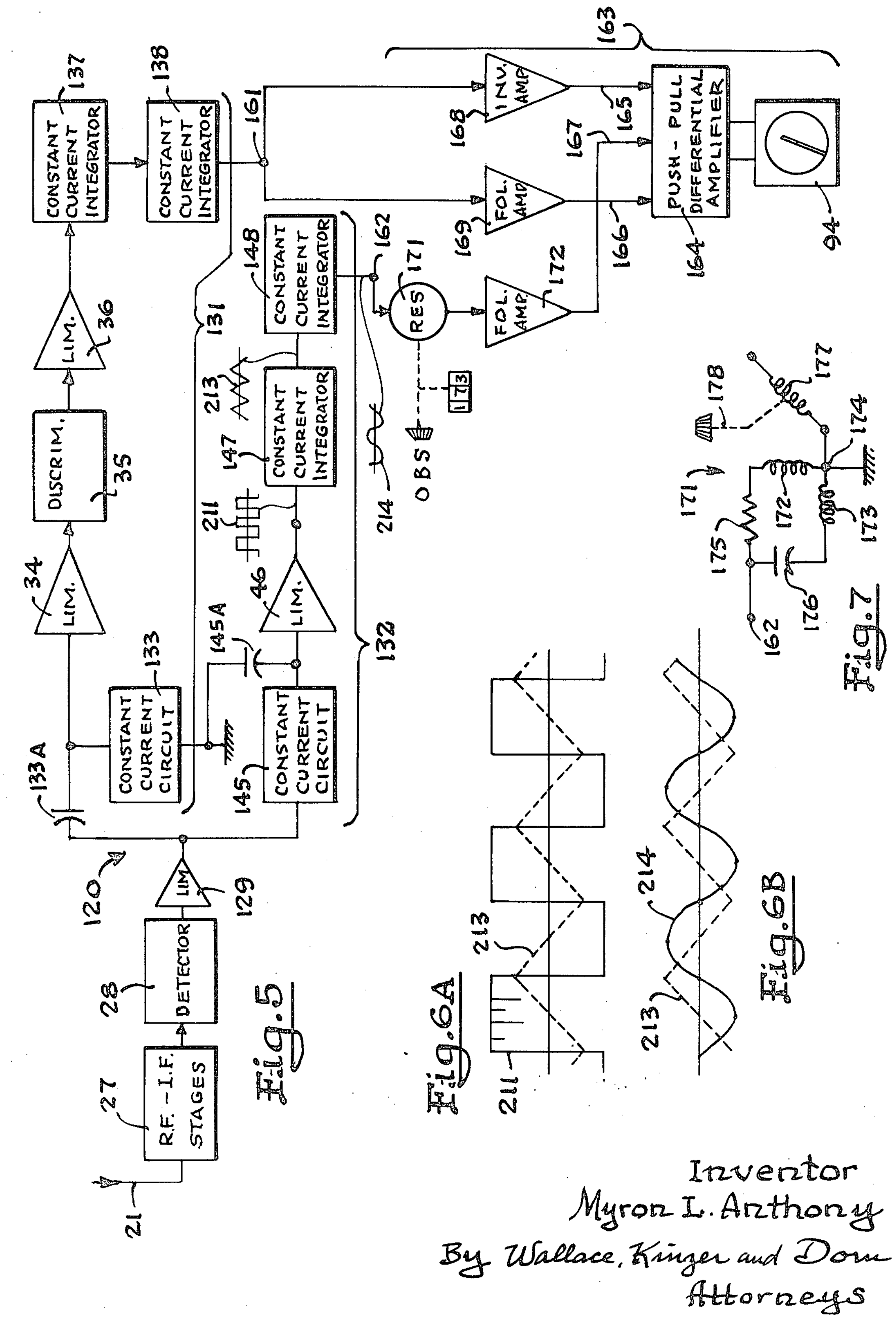
FIG. 5 is a block diagram of an aircraft navigation receiver apparatus constructed in accordance with another embodiment of the present invention.
FIGS. 6A and 6B are waveform diagrams utilized to explain the operation of active filtering means incorporated in the receiver apparatus of FIG. 5.
FIG. 7 is a schematic circuit diagram for a resolver employed in the receiver apparatus of FIG. 5.

FIG. 5 illustrates another embodiment of the invention comprising an aircraft navigation receiver apparatus 120. Receiver apparatus 120 is again a VOR receiver and hence is generally similar in organization to the receiver 20 (FIG. 1) but is substantially different in many of the operating circuits employed.

Receiver apparatus 120 comprises input stages that may be of conventional construction, including an antenna 21, coupled to a radio frequency and intermediate frequency stage 27 which is in turn coupled to a detector 28. The output from detector 28 is supplied to a first signal channel 131 and to a second signal channel 132, preferably through a limiter amplifier 129.

The first data signal channel 131 comprises an initial stage that functions as a high-pass filter but is not a conventional passive filter. This initial stage of channel 131 includes a series capacitor 133A and a constant current circuit 133 that is connected from capacitor 133A to system ground or another source of reference potential. The output of the high-pass circuit 133, 133A is applied to a limiter amplifier 34 which is in turn coupled to a discriminator 35. As in the previous embodiment, the output of discriminator 35 is applied to a limiter amplifier 36. Limiter 36 is the initial part of an active filtering means comprising a constant current integrator circuit 137 and an additional constant current integrator 138.

The second data signal channel 131, the variable phase signal channel of the VOR receiver, includes an input stage comprising a constant current circuit 145 having an output to which a capacitor 145A is connected, capacitor 145A being returned to system ground. Circuit 145, in conjunction with capacitor 145A, functions as the equivalent of a low-pass filter. The output of this low-pass circuit is supplied to the limiter amplifier 46 which is the initial stage of an active filtering means for this signal channel. The active filtering means also includes two series-connected constant current integrators 147 and 148.

The output signals from the signal channels 131 and 132, appearing at terminals 161 and 162 respectively, are supplied to a utilization means 163 that is substantially different from the conventional utilization means 63 of FIG. 1. Thus, the utilization stage 163 of receiver 120 comprises a push-pull differential amplifier 164 having two individual inputs 165 and 166 and a common input 167. The output signal from the first signal channel 131, taken from terminal 161, is applied to an inverting amplifier 168 having its output connected to input 165 of differential amplifier 164. The output signal from terminal 161 is also applied to the input of a follower amplifier 169 that is connected to the second individual input 166 of amplifier 164. Thus, the reference data signal from channel 131 is supplied to the two individual inputs of amplifier 164 with a phase displacement of 180° between the two applied signals.

The output signal from the variable phase data signal channel 132 of receiver apparatus 120, appearing at terminal 162, is applied to an OBS resolver 171. The output signal from resolvei 171 is applied to the input of a follower amplifier 172 that is connected to the common input 167 of amplifier 164.

The preferred construction for resolver 171 is illustrated in FIG. 7. As shown therein, the resolver includes a stator comprising two windings 172 and 173. One terminal of each of the windings 172 and 173 is connected to a terminal 174 that is returned to system ground or some other source of reference potential. The remaining terminal of winding 172 is connected to the input terminal 162 through a resistor 175. The remaining terminal of winding 173 is connected to input terminal 62 through a capacitor 176.

Resolver 171, in the preferred form illustrated in FIG. 7, further includes a rotor carrying a winding 177 that is disposed within the magnetic field of stator windings 172 and 173. The angular orientation of the output winding 177 of the resolver is adjustable relative to stator windings 172 and 173. A manual adjustment 178 is shown in the drawing.

The general operation of the receiver 120, FIG. 5, is substantially similar to that of receiver 20 of FIG. 1; only the differences introduced by the changes in components require discussion.

The initial change introduced in receiver 120 comprises the two initial stages for signal channels 131 and 132. It can be demonstrated that constant current circuit 133, in conjunction with capacitor 133A and in the presence of an amplitude-limited signal such as provided by limiter 129, functions as a high-pass filter. This circuit combination is effective to eliminate the 30 hz variable phase component of the detector VOR signal from channel 131 and has the substantial advantage that it does not introduce phase distortion into the signal being translated through channel 131. Similarly, constant current circuit 145, in combination with capacitor 145A, functions as an effective distortion-free low pass filter that translates the 30 hz signal into channel 132 without appreciable distortion. The amplitude modulation effects that frequently produce appreciable errors with conventional passive filters are completely eliminated by this form of active filtering in the two signal channels.

The constant current integrators 147 and 148 provide an operation that is substantially similar to the operation of integrators 47 and 48 described above. Thus, the square wave signal 211 from limiter 46 (FIGS. 5 and 6A) is translated through integrator 147 and appears as a triangular wave 213 in the output of circuit 147. The triangular waveform 213, in turn, upon integration in circuit 148, is reproduced as the sine wave 214. There is a total phase shift of 180° between signals 211 and 214, but the phase stability discussed above with respect to integrator circuits 47,48 is maintained over substantial variations in amplitude of signal 211 and substantial variations in the slope of the operating characteristics for the integrators that may occur with aging of components or from other causes.

Figure 8:
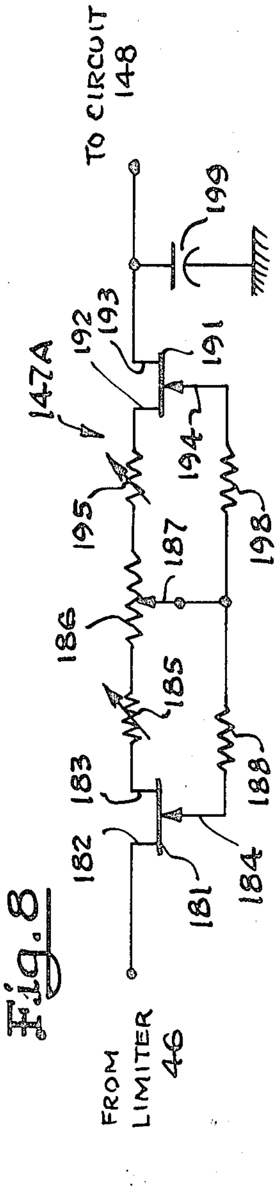
FIG. 8 is a schematic diagram of a constant current active filtering circuit that may be employed in the receiver apparatus of FIG. 5.

FIG. 8 illustrates one form of constant current circuit that may be used in construction of the receiver of FIG. 5. The constant current circuit 147A illustrated therein includes a first field effect transistor 181 having signal electrodes 182 and 183, each of which may function as an input or as an output electrode. The field effect transistor also comprises a control electrode 184. Signal electrode 182 is connected to limiter 46. Signal electrode 183 is connected through a variable resistor 185 to one terminal of a potentiometer 186. The adjustable tap 187 of potentiometer 186 is connected back through a resistor 188 to control electrode 184 of transistor 181.

The constant current circuit 147A further includes a second field effect transistor 191 having signal electrodes 192 and 193 and a control electrode 194. Signal electrode 192 is connected through a variable resistor 195 to the remaining terminal of potentiometer 186. Control electrode 194 is connected through a resistor 198 to the tap 187 on the potentiometer. Because the constant current circuit 147A is utilized as an integrating circuit, a capacitor 199 is connected from signal electrode 193 to system ground or other source of reference potential. The signal electrode 193 is also connected to the next circuit in the signal channel, in this instance the constant current integrator 148.

It can be demonstrated that the circuit of FIG. 8, over a broad range of input signal amplitudes from limiter 46, produces a current of constant amplitude at the output terminal comprising signal electrode 193. With capacitor 199 connected to the circuit, it functions as a substantially linear integrator over a relatively wide range of current amplitudes. The constant current circuit is bi-directional. When the input to signal electrode 182 is positive-going, the feedback signal supplied to the control electrode of the field effect transistor 181 limits the total current to a constant value determined by the resistance incorporated in the circuit. Under these circumstances, the bias on transistor 191 is in a forward direction and there is no attenuation of the current. When the input to electrode 182 is negative-going, transistor 181 is biased in a forward direction and operates at saturation so that it does not limit the current. But the feedback circuit for transistor 191 affords a reverse bias to that transistor portional to the signal current and limits the output current to a given maximum amplitude. Resistors 185 and 195 may be made adjustable to permit accurate calibration of the device to a specific desired current level. Potentiometer 187 permits balancing of the two halves of the constant current circuit.

It will be recognized that constant current circuit 147A corresponds to the configuration for the low-pass circuit 145,145A in the signal channel 132 of receiver 120. To afford the desired high-pass characteristics for circuit 133, 133A in channel 131, the constant current circuit is re-connected as shown in FIG. 5. Circuit 147A may be utilized as shown in FIG. 8 to afford the required active filtering means 137 and 138 for channel 131, duplicate circuits being employed. This is equally true of the active filtering means 147,148 of channel 132.

It will be recognized that amplifier 164 of the utilization means 163 in FIG. 5 is essentially similar in construction to discriminator 35A of FIG. 4 except that an independent input signal, the variable phase 30 hz signal, is supplied to the common input 167 of the push-pull differential amplifier 164. The operation of the phase comparator comprising amplifier 164 proceeds as described above in connection with FIG. 4 and controls the operation of a conventional bearing indicator 94. Adjustment of the phase of the variable phase signal as supplied to amplifier 167 is effected by resolver 171, under the control of the pilot, so that the indication at instrument 94 is made relative to the desired course of the aircraft instead of being dependent entirely upon the flight along a radial intersecting the location of the navigation station. The resolver construction illustrated in FIG. 7 produces a rotating vector field which induces a signal into the secondary winding 177. The phase of the output can be rotated smoothly through a total of up to 360° simply by rotating the resolver rotor. This affords a smoother and more accurate operation than is ordinarily obtained with the move conventional construction employed for OBS resolvers, in which the stator and rotor of the resolver are reversed, in comparison with the construction of resolver 171, as regards the input and output functions of the resolver.

Figure 9:
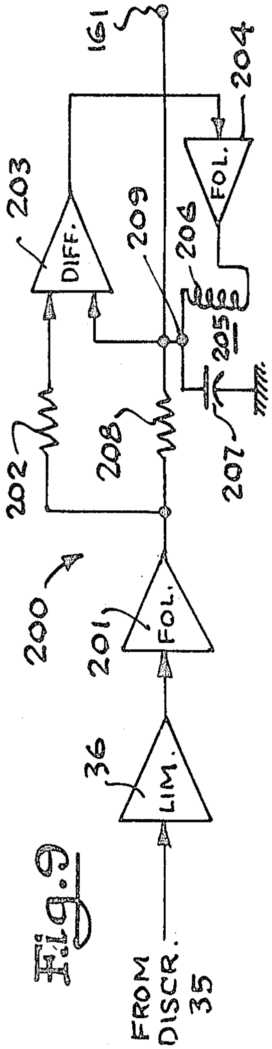
FIG. 9 is a partially schematic block diagram of another form of active filter circuit that may be incorporated in the receiver apparatus of FIGS. 1 and 5.

FIG. 9 is a block diagram, partly schematic, illustrating an active filtering circuit means 200 that may be incorporated in the VOR receiver of FIG. 5 in place of the constant current integrator circuits 137 and 138 in signal channel 131 or may be employed in the receiver of FIG. 5 in signal channel 132 instead of the constant current integrator circuits 147 and 148. By the same token, the active filtering circuit means 200 of FIG. 9 can be employed in the receiver of FIG. 1, in channel 31, instead of the integrator circuits 37 and 38 or in channel 32 as a replacement for the integrator circuit combination 47 and 48.

Circuit 200 of FIG. 9 begins with the limiter amplifier 36, the output of which is applied to a follower amplifier 201. The output from follower amplifier 201 is coupled through a resistor 202 to one input of a differential amplifier 203. The output of differential amplifier 203 is connected through a follower amplifier 204 to a resonant circuit 205 comprising an inductance 206 and a capacitance 207. Circuit 205 is a series-driven parallel resonant circuit with the common terminal 209 of the two reactive impedances connected to a second input to differential amplifier 203. Terminal 209 is also coupled through a resistor 208 to the output of the follower amplifier 201 and to the output terminal 161 for signal channel 131 (see FIG. 5).

In the operation of the active filter circuit means 200 of FIG. 9, the 30 cycle reference signal from the discriminator 35 (see FIG. 5) is clipped in limiter amplifier 36, so that the output from the limiter amplifier is a 30 hz signal of essentially rectangular waveform. This signal is supplied, through follower amplifier 201, to one input of differential amplifier 203. The output signal from the differential amplifier is applied to the resonant circuit 205, through follower amplifier 204, to produce a second input signal for the differential amplifier.

If resonant circuit 205 is exactly tuned to a frequency of 30 hz, and if the data signal being supplied to the differential amplifier 20 does not vary from the fixed 30 hz frequency, the output signal from the differential amplifier 203 is zero and the signal supplied to terminal 161 is the unchanged data signal from follower amplifier 201. But any small change in the resonance point of circuit 205 produces a small phase shift in the signal appearing at terminal 209. This phase shift produces an output signal from the differential amplifier. In such a case, with an imperfect phase null, the output signal from the differential amplifier is in quadrature phase relation with the initial input to the amplifier from follower 201.

The differential output signal from amplifier 203 is, in effect, inserted in series with the resonant circuit 205 and has the same effect as a change in the capacitance 207 or the inductance 206, depending upon the polarity of the differential output signal. The effect is to re-tune the resonant circuit, continuously, in accordance with the incoming signal. The output signal appearing at terminal 161, accordingly, does not change in phase with changes in frequency or with changes in the filter components due to aging or like factors. It can thus be seen that circuit 200 is a self-adaptive band-pass filter of very narrow frequency range that is effectively immune to the effects of any component aging or other drift. Moreover, the circuit has exceptionally good noise immunity and stability and is immune to amplitude modulation effects.

Figure 10:
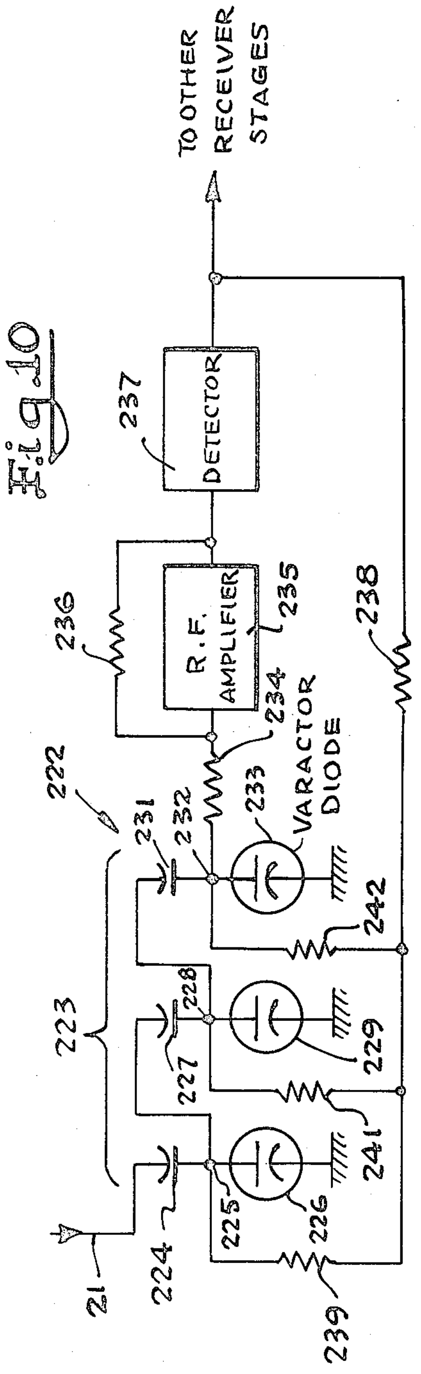
FIG. 10 illustrates an AGC circuit that may be utilized in the input stages of any of the receivers constructed in accordance with the invention.

As noted above, another source of substantial error in conventional aircraft navigation receivers is in the radio frequency stages. In particular, the variable-gain amplifiers utilized for automatic gain control frequently produce phase distortion, cross modulation, and other unwanted effects as a result of amplitude modulation of the incoming signals, noise, and like factors. FIG. 10 illustrates an automatic gain control circuit 222 that inherently and effectively eliminates these particular sources of difficulty.

The automatic-gain-controlled amplifier circuit of FIG. 10 includes an initial stage 223 comprising three series-connected reactive voltage dividers. The exact number of voltage dividers employed is not critical. In a given application four or more may prove necessary, while in other applications as few as two voltage dividers may be employed. The first voltage divider in stage 223 comprises a capacitor 224 connected between the antenna 21 and a center terminal 225. The center terminal 225 of the voltage divider is connected through a varactor 226 to system ground. Varactor 226 is a known form of variable capacitor in which the capacitance varies with changes of the D.C. voltage applied across the device.

The second voltage divider in stage 22 includes a capacitor 227 connected to terminal 225 in the preceding voltage divider circuit. Capacitor 227 is connected to a center terminal 228 for this second voltage divider, terminal 228 being returned to ground through a varactor 229. The third voltage divider circuit is of similar construction and includes a capacitor 231 connected from terminal 228 in the previous divider circuit to a center terminal 232. Terminal 232 is returned to ground through an additional varactor diode 233.

Terminal 232 in the final voltage divider of stage 223 is connected through a series resistor 234 to a radio frequency amplifier 235. Amplifier 235 is provided with a feedback circuit comprising a resistor 236; this is a negative feedback circuit restricting amplifier 235 to a constant and quite limited gain. The output of amplifier 235 is applied to a detector 237 which is connected to the remaining stages of the receiver.

The output of detector 237, a varying D.C. signal, is coupled back to each of the varactor diodes 226, 229 and 233. The coupling circuit comprises a series resistor 238 which is connected through a resistor 239 to the center terminal 225 of the first voltage divider. Similarly, the resistors 241 and 242 are employed to complete the connections from resistor 238 to the center terminals 228 and 232, respectively, of the second and third voltage dividers.

In operation, the capacitance of each of the varactors 226, 229 and 233 is continuously adjusted by the D.C. signal supplied to the varactor diodes from the output of detector 237. The purely reactive circuits of the voltage dividers to not introduce phase distortion in the signal transmitted through circuit 222. Because the radio-frequency amplifier 235 is operated at a constant gain, and receives the same level of input signal at all times when there is an input signal of useful amplitude, the amplifier functions as a linear device and does not introduce the distortions prevalent with amplifiers in which gain is constantly changed. Of course, the AGC system of FIG. 10 can be applied to an intermediate-frequency amplifier instead of a radio-frequency amplifier if desired. It will be apparent that circuit 222 can be used with any of the receivers described in conjunction with the preceding or succeeding figures relating to other aspects of the invention.

Figure 11:
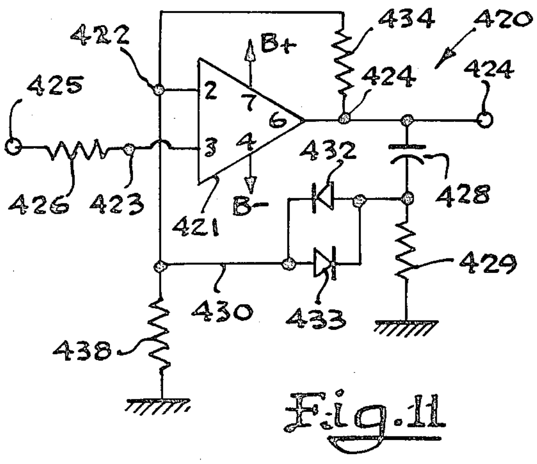
FIG. 11 is a simplified schematic drawing of a constant slew rate circuit that may be used in receivers constructed in accordance with the invention.

FIG. 11 illustrates a constant slew rate circuit 420 that constitutes an active filter usable in the navigation receivers of the present invention. The constant slew rate (hereinafter CSR) circuit 420 comprises an integrated-circuit solid state amplifier 421; the input terminal 425 for CSR circuit 420 is connected to the non-inverting input terminal 423 of the amplifier by a series resistor 426. A capacitor 428 is connected to the output terminal 424 of amplifier 421, which constitutes the output terminal of the circuit. A sensing resistor 429 is connected from capacitor 428 to reference ground. A D.C. stabilization feedback circuit comprising a resistor 434 is connected from output terminal 424 back to the inverting input 422 of amplifier 421.

There is an A.C. rate-limiting feedback means, in CSR circuit 420, that comprises a circuit 430 connecting the common terminal 431 of capacitor 428 and sensing resistor 429 back to the inverting input terminal 422 of amplifier 421. Feedback circuit 430 includes a pair of diodes 432 and 433 connected in parallel with each other in opposed polarization; the parallel combination of the diodes is connected in series in the rate-limiting feedback circuit 430. A resistor 438 is connected from terminal 422 to system ground. Diodes 432 and 433 establish a threshold level for the operation of the circuit in limiting the slewing rate of the output signal, as described hereinafter.

Figure 12:
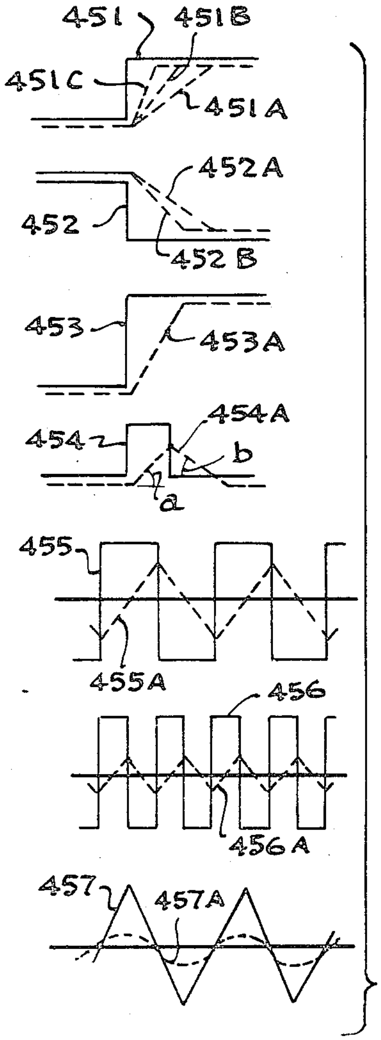
FIGS. 12 and 13 illustrate input and output waveforms to explain the operation of the circuit of FIG. 11.

FIG. 12 comprises a series of input and output signal waveforms illustrative of operation of the constant slew rate circuit 420 of FIG. 11. In each instance, the input signal waveform is shown in solid lines, with the output signal in dash lines. The first input signal illustrated in FIG. 12 is a positive-going step function signal 451. Signal 451, when applied to the input terminal 425 of the constant slew rate circuit 420, produces an amplified signal of the same polarity at the output terminal 424 of the circuit. The positive-going voltage thus developed at output terminal 24 begins to charge capacitor 28 through the low-impedance sensing resistor 429. The voltage drop across resistor 429 is a function of the charging current through capacitor 428; this voltage drop is supplied to the inverting input 422 of amplifier 421 through the A.C. rate feedback circuit 430. It can be shown that the output voltage of the amplifier will be such that the voltage across sensing resistor 429 is proportional to the rate of change in amplitude of the input signal.

With a constant voltage drop across sensing impedance 429, which is in series with capacitor 428, the charging rate of capacitor 428 is a straight line function. That is, the charging rate of capacitor 428 has a constant slope or "slewing rate". The slewing rate for CSR circuit 420 is determined by the impedances of capacitor 428 and sensing resistor 429 and by the amplitude of the input voltage, signal 451. The direction of the slope depends upon the polarity of the input signal. The output signal from CSR circuit 420, in response to the step function input signal 451, is represented by the dash line 451A

(FIG. 12). A decrease in the impedance of resistor 429 can be utilized to change the slope to that indicated by the dash line 451B whereas a decrease in the impedance of the sensing resistor can shift the slope of the output voltage in the opposite direction to curve 451C. Corresponding changes in the slope or slewing rate of the circuit can be effected by changing the value of the capacitor 428.

When a negative-going step function is applied to the input of CSR circuit 420 (e.g., the signal 452 in FIG. 12) the operation of the circuit is as described above. The resulting output signal 452A is, again, a signal of constant linear slope. As before, a decrease in the impedance of resistor 429 affords a greater slope in the output signal, illustrated by signal 452B. An increase in the sensing resistance has the opposite effect.

The slew rate of CSR circuit 420 is dependent upon the amplitude of the input signal. Thus, a positive-going step function signal 453 (FIG. 2) produces an output signal 453A having a steeper slope (greater slew rate) than the output signal 451A produced by the input signal 451A of similar shape but lower amplitude. This can be controlled by appropriate control of the input amplitude, as by the limiter amplifiers 36 and 46, FIG. 1.

When a positive-going signal pulse of rectangular waveform is applied to the input terminal 425 of the constant slew rate circuit 420 (FIG. 11), as illustrated by signal 454 (FIG. 12), the output signal produced by the circuit is a triangular pulse 454A. The slope of the positive-going portion of the triangular waveform output signal is the same as the slope of the negative-going portion, except for a reversal of 180°. That is, the angle *a* is the same as the angle *b*. Stated differently, the slewing rate for the circuit remains constant, whether the output signal changes in a positive direction or a negative direction.

A square wave signal of given frequency, such as the signal 455 (FIG. 2), when applied to the input of CSR circuit 420, produces an output signal 455A of triangular wave form. The slopes of the positive-going and negative-going portions of the triangular waveform signal 455A are equal, as in the case of a single pulse described above. The output signal 455A is precisely locked in phase to the input signal 455, but with a phase retardation of 90°.

An input signal 456 of rectangular waveform, having the same amplitude but at twice the frequency of signal 455, may be supplied to CSR circuit 420, and again produces an output signal 456A of triangular waveform. The slewing rate for signal 456A, corresponding to the slopes of the positive and negative-going portions of the signal, is the same as for signal 455A. However, the amplitude of the output signal 456A is not as great as signal 455A because the available time for each change of signal polarity is only one-half that previously available. As before, the output signal 456A for circuit 420 is retarded 90° in phase as compared to input signal 456.

The foregoing operational description does not take into account the diodes 432 and 433. The diodes 432 and 433 establish a threshold for the rate-limiting feedback signal in circuit 430; slowly changing signals that never exceed this threshold (the forward diode voltage drop) are amplified in circuit 420 without substantial modification in waveform.

Thus, for CSR circuit 420, a slowly-changing sinusoidal input signal 458 (FIG. 13), basically a signal of low frequency and low amplitude, is reproduced by the circuit as a similar low-amplitude low-frequency sine wave 458A; there is no change of phase. Similarly, a low-amplitude low-frequency signal 459 of triangular waveform is translated through CSR circuit 20A without appreciable change in waveform or in phase, resulting in the output signal 459A. This does not result in the establishment of a true low-frequency cut-off for the CSR circuit 420; a low-frequency input signal that has a high rate of change in amplitude produces an output signal that is rate-limited. Thus, a low-frequency square wave input signal 461 produces a triangular wave output signal 461A. The diodes 432 and 433 introduce a minor variation in the rate-limited triangular output waveform, due to the forward voltage drops of the diodes, as shown in exaggerated form at 462 in FIG. 13. This variation can be accepted with no difficulty in some applications; in others, compensation may be desirable. In particular, at higher frequencies the small square-wave introduced into the output signal by the diode drop 462 may cause some difficulty. An effective compensation circuit is discussed hereinafter in connection with FIG. 17.

Figure 14:
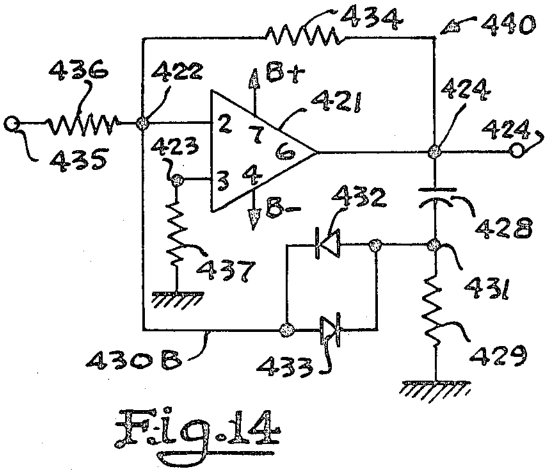
FIG. 14 is a simplified schematic illustration of a constant slew rate circuit constructed in accordance with another embodiment of the invention.

FIG. 14 illustrates another constant slew rate (CSR) circuit 440 constructed in accordance with a different embodiment of the present invention. CSR circuit 440 comprises an integrated solid state amplifier 421 having an inverting input 422, a non-inverting input 423, and an output 424 that constitutes the output terminal for the complete circuit. The input terminal 435 for CSR circuit 440 is connected by a series resistor 436 to the inverting input 422 of amplifier 421. The non-inverting input 423 of amplifier 421, in this embodiment, is connected to system ground through a resistor 437.

In CSR circuit 440, a capacitor 428 is connected from output terminal 424 to a resistor 429 that is returned to system ground. The common terminal 431 of capacitor 428 and resistor 429 is connected in a first feedback circuit 430B that extends from terminal 431 back to the inverting input terminal 422 of amplifier 421. This is an A.C. rate-limiting feedback circuit that includes, in series, the parallel combination of two diodes 432 and 433, as in the previous circuit. Furthermore, CSR circuit 440 includes a second feedback means, comprising a resistor 434 connected from output terminal 424 to inverting input 422, affording a negative feedback D.C. stabilization circuit and gain adjustment for amplifier 421.

The operation of CSR circuit 40 (FIG. 14) is generally similar to circuit 420. A positive-going input signal applied to input terminal 435 produces a negative-going output signal at the output terminal 424 of the CSR circuit. The output voltage begins to charge capacitor 428, producing a voltage drop across sensing resistor 429 that is a function of the charging current. The signal across resistor 429 is applied to the inverting input 422 of amplifier 421 through the A.C. rate feedback circuit 430B. As in circuit 420, the voltage across resistor 429 must exceed the forward voltage drop across the diodes 432,433 before there is an effective limitation on the rate of change of the output signal. Once the drop across resistor 429 exceeds this threshold, the gain of the circuit is such that the voltage across resistor 429 exactly matches the diode drop. Consequently, the charging rate of capacitor 428 is a straight line function, and the CSR circuit 440 produces an output signal having a constant, limited slope or slewing rate.

In CSR circuit 440, as in circuit 420, the slewing rate is controlled by the impedance values of capacitor 428 and resistor 429. However, unlike circuit 420, the rate-limiting operation of circuit 440 is essentially independent of the amplitude of the input signal. Otherwise, and making allowance for the signal inversion in circuit 440, the two circuits perform in essentially similar manner.

Figure 13:
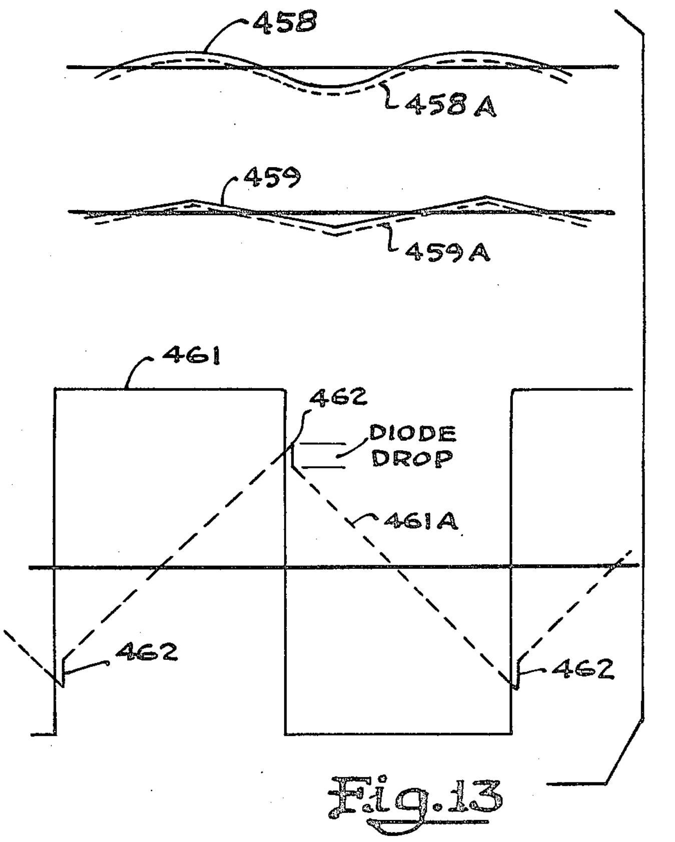

In the operation of CSR circuit 440, as in circuit 420, there is no rate-limiting feedback signal from the sensing circuit comprising capacitor 428 and resistor 429 until the voltage drop across resistor 429 exceeds the forward voltage drop across one of the diodes 432 and 433. Consequently, a signal that has a low rate of change is not modified in its waveform; for slow-changing input signals, CSR circuit 440 constitutes a simple amplifier. Thus, if a low-frequency, low-amplitude signal is supplied to constant slew rate circuit 440, the resulting output signal will be a faithfully amplified reproduction of the input signal, but with a 180° change in phase. Thus, the waveforms of FIG. 13 are applicable to CSR circuit 440 (FIG. 14) as well as to CSR circuit 20A (FIG. 11), except that the output signals from circuit 440 are inverted in phase relative to the input signals.

CSR circuit 420 (FIG. 11) is an integrator, but CSR circuit 440 is a non-integrating circuit. The output of circuit 420, for A.C. signals having a high slewing rate, are retarded 90° in phase, whereas the output of circuit 40 is advanced 90°. But both types of CSR circuit afford an effective and consistent slew rate limiting action that remains constant over a substantial frequency range and is essentially independent of aging of components.

To afford a more explicit example of the CSR circuits 420 and 440 of FIGS. 11 and 14, specific circuit parameters are set forth hereinafter. This information is presented solely by way of illustration and in no sense as a limitation on the invention.

| | |
|---|---|
| Resistors 26, 36, 37, 38 | 10 kilohms |
| Capacitor 28 | 1 microfarad |
| Resistor 29 | 680 ohms (variable) |
| Resistor 34 | 330 kilohms |
| Amplifier 21 | uA741 Fairchild |
| Diodes 32,33 | 1N914 |

With these circuit parameters, and with resistor 429 adjusted to 220 ohms, the cut-off frequency for the circuits, as low-pass filters, is 60 hz.

For all practical purposes, the response characteristics of the constant slew rate circuits 420 and 440 correspond to those of a servo system having a maximum slewing rate imposed by the top speed of the servo motor, but with the important difference that the CSR circuits exhibit essentially zero inertia. The analogy is enhanced by the use of the threshold diodes 432,433 in the rate-limiting feedback means of the CSR circuits 420 and 440; the diodes avoid introduction of time delay and establish a fixed, known threshold for the slew rate limitation imposed on the output signal.

The attenuation characteristics for each of the circuits described above are those of a low-pass filter, being 6 db per octave. Phase characteristics of these circuits, particularly circuits 420 and 440, are highly suitable for applications, such as VOR receivers, in which absolute phase fidelity is essential. It can be shown that for both circuits the phase shift is zero below a given corner or cut-off frequency, determined by the impedance values of capacitor 428 and resistor 429. Above the corner frequency, the phase shift is exactly 90°, with the sign of the phase shift depending upon which of the two CSR circuits 420 and 440 is used.

In contrast, a conventional resistance-capacitance filter exhibits a gradual change of phase, with changes in input frequency, of a non-linear nature, both above and below the cut-off or corner frequency for the filter. Indeed, for even a high quality resistance-capacitance filter there is a substantial phase shift that may be of the order of one degree even at one decade below the corner frequency and that is subject to variation with even minute frequency changes. Phase variations of this kind cannot be tolerated in precision navigation applications, such as VOR receivers. The attenuation characteristics for the CSR filter and the conventional resistance-capacitance filter exhibit the same kind of differences. The attenuation by a conventional passive resistance-capacitance filter can only approach zero and always produces at least some phase variations. Moreover, a passive R-C filter always exhibits at least some phase shift, regardless of circuit parameters, with changes in circuit component values and environmental conditions. These phase shifts are eliminated in the CSR circuits of the present invention.

Figures 15, 16:
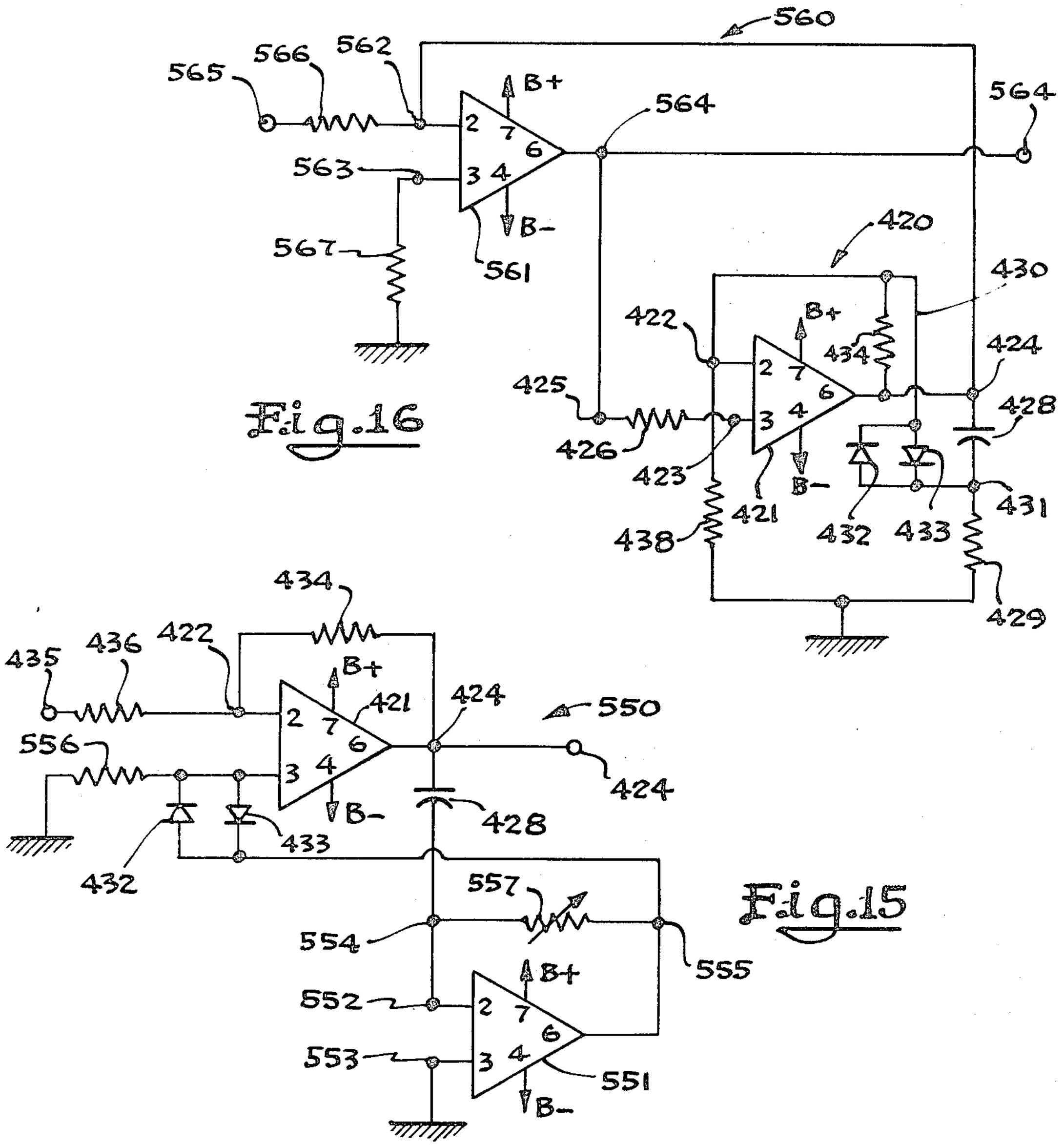
FIG. 15 illustrates another constant slew rate circuit usable in the receivers of the present invention.
FIG. 16 illustrates a differentiator and high pass circuit utilizing a constant slew rate circuit constructed in accordance with the present invention.

FIG. 15 illustrates another constant slew rate circuit 550 that may be utilized in navigation receivers constructed in accordance with the present invention. CSR circuit 550 is basically similar to the CSR circuit 440 of FIG. 14 in many respects. It comprises an integrated amplifier 421 having an inverting input 422, a non-inverting input 423 and an output 424 that comprises the output terminal for the CSR circuit. The input terminal 435 of CSR circuit 505 is connected to the inverting input 422 of amplifier 421 by a series resistor 436. As before, there is a D.C. stabilization negative feedback circuit comprising a resistor 434 connected from output terminal 424 back to the inverting input 422 of amplifier 421.

The output 424 of the main amplifier 421 is connected to a capacitor 428. Instead of the small sensing resistor used in the previous CSR circuits, however, the sensing impedance in CSR circuit 550 comprises a second integrated solid state amplifier 551 having an inverting input 552 that is connected to capacitor 428 at a terminal 554. Amplifier 551 has a non-inverting input 553 that is returned to the reference ground plane. The output terminal 555 of amplifier 551 is connected to the non-inverting input 423 of the main amplifier 421 by an A.C. rate-limiting feedback circuit including, in series therewith, the parallel combination of the two threshold-establishing diodes 432 and 433. The non-inverting input 423 of the main amplifier 421 is also connected to a resistor 556 that is returned to ground. A variable resistor 557 is connected between terminals 554 and 555 as a part of the rate-limiting feedback circuit.

The basic operation of CSR circuit 550 is generally similar to the other CSR circuits described above, particularly the CSR circuit 440 of FIG. 14. An input signal supplied to terminal 435 of CSR 550 (FIG. 15) is amplified by amplifier 421 and begins to charge capacitor 428. The charging current for capacitor 428 produces an output voltage, at the output terminal 555 of amplifier 551, that is a function of the rate of change of the input signal to the CSR circuit. However, capacitor 428 appears to be grounded, because terminal 553 is returned to ground; thus, the rate signal is not in series with the CSR output voltage. Nevertheless, the overall operation is essentially the same as in the previously described CSR circuits. CSR circuit 550, however, can be adjusted more precisely and accurately, with respect to the slewing rate of the circuit, by varying resistor 557.

The CSR circuits 420, 440 and 550 are all quite suitable for use in the VOR receivers of the present invention; each constitutes an effective active filtering means highly suitable for this application. Thus, referring back to FIG. 1, two of the CSR circuits can be substituted for the integrators 37 and 38 in channel 31; similarly, two of the CSR circuits can replace the integrators 47 and 48 in channel 32. The CSR filters afford high-level performance with no concern for aging of components or other common sources of phase shift. Their response rate can be made more rapid than conventional integrators, while still performing the requisite filtering functions. These circuits are the most effective and efficient active filters presently available for the navigation receivers of the invention.

FIG. 16 illustrates a differentiator or high-pass filter circuit 560, utilizing a CSR circuit, suitable for use as filter 33 or 133 in FIGS. 1 and 5, respectively. The constant slew rate circuit that is incorporated in differentiator 560 is the CSR circuit 420 of FIG. 11 and hence need not be described in detail. In addition to the CSR circuit, differentiator 560 includes an additional solid state integrated amplifier 561 having an inverting input 562, a non-inverting input 563, and an output 564. The input terminal 565 for differentiator 560 is connected to the inverting input 562 of amplifier 561 by a series resistor 566. The non-inverting input for amplifier 561 is returned to ground through a resistor 567. The output 564 of amplifier 561, which is also the output for the complete differentiator 560, is connected to the input terminal 425 of CSR circuit 420, whereas the output terminal 424 of the CSR circuit is connected back to the inverting input 562 of amplifier 561.

As will be apparent from FIG. 16, CSR circuit 420 functions as an integrator connected in a negative feedback circuit for amplifier 561, thus providing a differentiating circuit that constitutes a high-pass filter. It should be recognized that similar differentiators can be constructed with the other CSR circuits described above; thus, if the CSR circuit 440 is substituted for circuit 420 in FIG. 16, the only additional change necessary is to shift the return connection from the output 424 of the CSR circuit to the non-inverting input 563 of amplifier 561 instead of to the inverting input 562.

Figure 17:
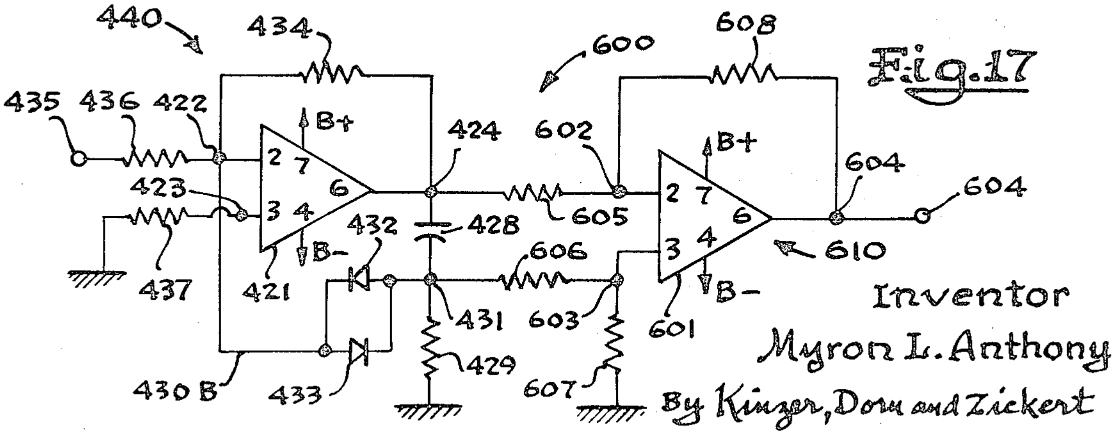
FIG. 17 is a schematic diagram of another embodiment of the invention, based on the circuit of FIG. 14.

FIG. 17 illustrates a CSR circuit 600 that is based upon the CSR circuit 440 (FIG. 14) but that effectively compensates for the drop across the diodes in the rate-limiting feedback circuit. The input stage 440 of CSR circuit 600 thus comprises an integrated solid state operational amplifier 421 having an inverting input 422 connected by a resistor 436 to the input terminal 435 for the CSR circuit. The non-inverting input 423 of the I-C amplifier 421 is connected to a resistor 437 that is returned to system ground.

The output terminal 424 of amplifier 421 is connected to a capacitor 428 that is returned to system ground through a sensing resistor 429. A rate-limiting feedback circuit 430B connects the common terminal 431 of capacitor 428 and resistor 429 back to the inverting input 422 of amplifier 421. A D.C. stabilization feedback circuit, comprising a resistor 434, connects the output terminal 424 of amplifier 421 back to the inverting input 422 of the amplifier.

CSR circuit 600 further includes a second or compensation stage 610 comprising an integrated-circuit solid state amplifier 601 having an inverting input 602, a non-inverting input 603, and an output 604, output 604 being the output terminal for the CSR circuit. The output terminal 424 of the initial stage 440 is connected to the inverting input 602 of amplifier 601 through a series resistor 605. The non-inverting input 603 of amplifier 601 is connected to the center terminal of a voltage divider comprising two resistors 606 and 607; resistor 606 is connected to terminal 431 in stage 440 and resistor 607 is returned to system ground. A feedback connection is made from output terminal 604 back to the inverting input 602 of amplifier 601 through a resistor 608.

Operation of the initial stage 440 in CSR circuit 600 is as described above. For slow-changing input signals (low slew rates) the voltage drop across resistor 429, which is proportional to the slew rate, may be less than the voltage necessary to cause one of the diodes 432 and 433 to conduct. For such signals, the rate feedback circuit 430B is effectively blocked and amplifier 421 functions as a unity gain inverting amplifier. These slow-changing signals are also translated through the second stage amplifier 601 without rate limitation, retaining their original waveform.

For input signals having higher slew rates, the voltage across resistor 429 reaches the diode drop potential and diodes 432,433 conduct the rate feedback signal. The gain of amplifier 421 is controlled so that the drop across resistor 429 exactly matches the diode drop, establishing a constant, limited slew rate output. The D.C. gain of the circuit is unity and circuit operation is extremely stable. However, as discussed above, the voltage drop across diodes 432 and 433 introduces a minor problem with respect to high frequency suppression; at high frequencies the small square wave component caused by the voltage drop across the two diodes is more perceptible than at low frequencies. Moreover, the attenuation curve drops off to a constant level and does not quite reach zero.

In analyzing the operation of the second stage 610 of CSR circuit 600, it should be remembered that for an operational amplifier the voltage difference at the input terminals is essentially zero, and that there is negligible current flow into the input terminals. Since the non-inverting input terminal 603 of amplifier 601 is at system ground potential, the inverting input terminal 602 is also at ground. Thus, the drop across diodes 432 and 433 appears at the other terminal 431 of the diodes relative to ground. The square wave diode drop is in phase with the output signal of amplifier 421 and must be subtracted from that signal to afford a clean constant-slope triangular wave output.

The second amplifier 601 in CSR circuit 600 is connected as a 1:1 inverting amplifier in stage 610. The diode drop signal is fed into the non-inverting input terminal 603 of amplifier 601 and consequently is subtracted from the output signal supplied to the inverting input 202 of the same amplifier. Resistors 605 and 606 are of equal impedance and hence comprise a 2:1 voltage divider. This is necessary because the gain of amplifier 601 is two for non-inverting input signals. It is thus apparent that the square wave diode voltage drop signal is effectively subtracted from the output signal of the first stage 440 of CSR circuit 600, in the second stage 610, producing a clean, constant slope output signal at terminal 604. Thus, the minor distortion introduced by the diodes in the rate feedback circuit is entirely eliminated in the CSR circuit 600.

To afford an explicit example of the CSR circuit 600, specific circuit data are set forth below for 30 hz. operation. This information is presented solely by way of illustration and in no sense as a limitation on the invention.

| | |
|---|---|
| Resistors **34,36,37, 205–208** | 10 kilohms |
| Resistor **29** | 470 ohms |
| Capacitor **28** | 1 microfarad |
| Amplifiers **21,201** | uA741 Fairchild |
| Diodes **32,33** | 1N914 |

A compensation stage can be added to the basic CSR circuit 420 of FIG. 11 to eliminate the effect of the forward drop of the threshold diodes in the rate feedback circuit, as done with the CSR circuit 440 in the circuit shown in FIG. 17. Other variations in the two feedback circuits can be made as long as the basic configuration for the CSR circuit is maintained.

I claim:

1. Aircraft navigation receiver apparatus, of the kind in which first and second data signals radiated from a navigation station are compared to determine the orientation of an aircraft relative to a reference, comprising:
   - a first signal channel for translating said first data signal into a form suitable for comparison with the second data signal, said first signal channel comprising active filtering means for effectively eliminating extraneous signals accompanying said first data signal without appreciable distortion of said first data signal;
   - a second signal channel for translating said second data signal into a form suitable for comparison with the first data signal, said second signal channel comprising active filtering means for effectively eliminating extraneous signals accompanying said second data signal without appreciable distortion of said second data signal;
   - and utilization means, comprising comparison means coupled to said first and second signal channels, for comparing said first and second data signals, as translated through said channels, to determine the orientation of the aircraft.

2. Aircraft navigation receiver apparatus according to claim 1 in which said active filtering means in at least one of said signal channels comprises a limiter amplifier and two integrator circuits interposed in series with each other in said signal channel.

3. Aircraft navigation receiver apparatus according to claim 2 in which each of said integrator circuits comprises a solid state operational amplifier having a resistor connected in series in the input to the amplifier and further having a capacitor connected in parallel between the input and the output of the amplifier.

4. An aircraft navigation receiver apparatus according to claim 1 in which said active filtering means in at least one of said signal channels comprises a limiter amplifier connected in series with two constant current amplifiers each having an input and an output and each having a capacitor connected from the output of the amplifier to a source of reference potential.

5. Aircraft navigation receiver apparatus according to claim 1, in which said active filtering means in at least one of said signal channels comprises a limiter amplifier for developing a data signal of rectangular waveform, a differential amplifier having one input coupled to the output of said limiter amplifier, and a variable-resonance circuit, initially tuned to the data signal frequency, coupled to the output of said differential amplifier and varied in its resonance frequency by the output signal of said differential amplifier, said variable-resonance circuit being coupled back to a second input of said differential amplifier.

6. Aircraft navigation receiver apparatus according to claim 1 in which said active filtering means in at least one of said signal channels is a constant slew rate circuit producing an output signal of constant linear slope upon application of a step function signal thereto.

7. Aircraft navigation receiver apparatus according to claim 6, in which said constant slew rate circuit comprises:
- an integrated solid state amplifier having an inverting input, non-inverting input, and an output;
- first feedback means comprising a capacitor connected to said output of said amplifier, sensing impedance connected from said capacitor to a plane of reference potential, and an A.C. rate feedback circuit connected from the common terminal of said capacitor and said sensing impedance to one input of said amplifier; and
- second feedback means comprising a negative feedback D.C. stabilization circuit connected from said amplifier output to one of said inputs of said amplifier.

8. Aircraft navigation receiver apparatus according to claim 1, comprising a receiver in which said first signal channel is a reference signal channel having a high-pass filter in its initial stage and further having a discriminator circuit interposed between said high-pass filter and said active filtering means, and said second signal channel is a variable signal channel having a low-pass filter in its initial stage ahead of said active filtering means for said second signal channel.

9. Aircraft navigation receiver apparatus according to claim 8, for use with VOR signals, in which said high-pass and low-pass filters are resistance-capacitor filters having operational characteristics that intersect each other approximately at the logarithmic mean of 30 hz and 9,960 hz.

10. Aircraft navigation receiver apparatus according to claim 8 in which said discriminator comprises a push-pull differential amplifier having two inputs to which said data signal is supplied in opposite phase, the two stages of said amplifier each being driven to saturation in alternate half cycles of said first data signal, and in which said data signal is applied, with a phase shift of 90°, to a common connection for both stages of said push-pull differential amplifier, to cut off both stages of said differential amplifier in alternate half cycles.

11. Aircraft navigation receiver apparatus according to claim 10, in which the circuit for supplying said data signal with 90° phase shift to both stages of said push-pull differential amplifier comprises, in series, a follower amplifier, an inductance-capacitance tuned circuit driven in series and having an output taken from a parallel connection, and an additional follower amplifier for coupling the output of said tuned circuit to said differential push-pull amplifier.

12. Aircraft navigation receiver apparatus according to claim 8 in which said high-pass filter is a constant current differentiator circuit and said low-pass filter is a constant current integrator circuit.

13. Aircraft navigation receiver apparatus according to claim 10 in which said active filtering means in at least one of said signal channels comprises a limiter amplifier in series with two constant current amplifiers each having an input and an output and each having a capacitor connected from the output of the amplifier to a source of reference potential.

14. An aircraft navigation receiver apparatus according to claim 12 in which a limiter circuit is incorporated in the receiver apparatus before any filtering means in either of said first and second signal channels, whereby the first and second data signals supplied to said channels are of substantially rectangular waveform.

15. Aircraft navigation receiver apparatus according to claim 8 in which said comparison means comprises a push-pull differential amplifier, having two individual inputs with means for applying the first data signal from said first channel to said two inputs in phase opposition, each stage of said amplifier being driven to saturation in alternate half cycles, and a third input common to both stages of said push-pull differential amplifier with means for applying the second data signal from said second channel to said third input to drive both stages to cut off in alternate half cycles.

16. Aircraft navigation receiver apparatus according to claim 8 and further including phase adjusting means for adjusting the phase of one of said data signals as applied to said push-pull amplifier, said phase adjusting means comprising a resolver having two stationary quadrature windings to which said one data signal is applied and having a rotatable output winding disposed within the magnetic field of said stationary windings, and means for adjusting the angular position of said output winding to vary the relative phase of said one data signal as applied to said push-pull differential amplifier.

17. Aircraft navigation receiver apparatus according to claim 8 in which said high-pass filter is an amplifier having a constant slew rate circuit connected in a negative feedback circuit for the amplifier, said constant slew rate circuit comprising:
- a main integrated solid state amplifier having an inverting input, a non-inverting input, and an output;
- first feedback means comprising a capacitor connected to said output of said main amplifier, a sensing impedance connected from said capacitor to a plane of reference potential, and an A.C. rate feedback circuit connected from the common terminal of said capacitor and said sensing impedance to one input of said main amplifier; and
- second feedback means comprising a negative feedback D.C. stabilization circuit connected from said main amplifier output to one of said inputs of said main amplifier.

18. Aircraft navigation receiver apparatus according to claim 8, in which said active filtering means in each channel, other than said high-pass and low-pass filters, includes at least one constant slew rate circuit comprising:
- a main integrated solid state amplifier having an inverting input, a non-inverting input, and an output;
- first feedback means comprising a capacitor connected to said output of said main amplifier, a sensing impedance connected from said capacitor to a plane of reference potential, and an A.C. rate feedback circuit connected from the common terminal of said capacitor and said sensing impedance to one input of said main amplifier; and
- second feedback means comprising a negative feedback D.C. stabilization circuit connected from said main amplifier output to one of said inputs of said main amplifier.

19. Aircraft navigation receiver apparatus according to claim 18 in which said rate feedback circuit in the CSR circuit includes threshold means precluding any effective rate-limiting A.C. feedback to said main amplifier until the voltage drop across said sensing impedance exceeds a predetermined minimum threshold voltage, said threshold means including a pair of diodes connected in parallel with each other and in opposed polarities, interposed in said rate feedback circuit, and in which said minimum threshold voltage is the forward breakdown voltage of said diodes.

20. Aircraft navigation receiver apparatus according to claim 1 and further comprising an automatic gain control circuit in the input to stages of said receiver apparatus ahead of said first and second signal channels, said AGC circuit comprising an amplifier operating at constant gain, a plurality of series-connected purely reactive voltage dividers connected in the input to said amplifier, and a direct-current feedback circuit from the output of said amplifier to each of said voltage divider circuits for varying the reactance of one leg in each of said voltage divider circuits.

21. Aircraft navigation receiver apparatus according to claim 20 in which said one leg of each of said voltage dividers that varies in reactance comprises a voltage-responsive variable capacitor.

22. Aircraft navigation receiver apparatus, of the kind in which first and second data signals of corresponding frequency but varying phase are compared to determine the orientation of an aircraft relative to a reference path, comprising:
- first and second signal channels for segregating said data signals from each other and for effectively eliminating extraneous signals therefrom;
- and comparison means for comparing said data signals, said comparison means comprising a push-pull differential amplifier, having two individual inputs with means for applying the first data signal from said first channel to said two inputs in phase opposition, each stage of said amplifier being driven to saturation in alternate half cycles, and a third input common to both stages of said push-pull differential amplifier with means for applying the second data signal from said second channel to said third input to drive both stages to cut off in alternate half cycles.

23. Aircraft navigation receiver apparatus, according to claim 22, and further comprising an automatic gain control circuit, ahead of said first and second signal channels, said automatic gain control circuit comprising an amplifier operating at constant gain, a plurality of series-connected purely reactive voltage dividers connected in the input to said amplifier, and a direct-current feedback circuit from the output of said amplifier to each of said voltage divider circuits for varying the reactance of one leg in each of said voltage divider circuits.

24. Aircraft navigation receiver apparatus according to claim 22, and further including phase adjusting means for adjusting the phase of one of said data signals as applied to said push-pull amplifier.

25. Aircraft navigation receiver apparatus according to claim 24 in which said phase adjusting means comprises a resolver having two stationary quadrature windings to which said one data signal is applied and having a rotatable output winding disposed within the magnetic field of said stationary windings, and means for adjusting the angular position of said output winding to vary the relative phase of said one data signal as applied to said push-pull differential amplifier.

* * * * *